US012767178B2

(12) United States Patent
Raphael et al.

(10) Patent No.: US 12,767,178 B2
(45) Date of Patent: Oct. 20, 2026

(54) ROUTING OF AN AUTONOMOUS VEHICLE TO ARRIVE AT A TARGET TIME OF ARRIVAL

(71) Applicant: Volvo Autonomous Solutions AB, Gothenburg (SE)

(72) Inventors: Ribero Raphael, Millery (FR); Da Rocha Mathilde, Diemoz (FR); Quibriac Yann, Lyons (FR)

(73) Assignee: VOLVO AUTONOMOUS SOLUTIONS AB, Gothenburg (SE)

(*) Notice: Subject to any disclaimer, the term of this patent is extended or adjusted under 35 U.S.C. 154(b) by 16 days.

(21) Appl. No.: 18/858,855

(22) PCT Filed: Apr. 29, 2022

(86) PCT No.: PCT/EP2022/061611
§ 371 (c)(1),
(2) Date: Oct. 22, 2024

(87) PCT Pub. No.: WO2023/208384
PCT Pub. Date: Nov. 2, 2023

(65) Prior Publication Data

US 2025/0282389 A1 Sep. 11, 2025

(51) Int. Cl.
*B60W 60/00* (2020.01)
*G01C 21/34* (2006.01)

(52) U.S. Cl.
CPC ..... *B60W 60/0021* (2020.02); *G01C 21/3492* (2013.01); *B60W 2520/10* (2013.01);
(Continued)

(58) Field of Classification Search
CPC ......... B60W 60/0021; B60W 2520/10; B60W 2540/215; B60W 2552/05;
(Continued)

(56) References Cited

U.S. PATENT DOCUMENTS

| | | | | | |
|---|---|---|---|---|---|
| 10,535,256 | B1 * | 1/2020 | Lim | ................. | G08G 1/096811 |
| 2017/0192437 | A1 * | 7/2017 | Bier | ....................... | G01C 21/28 |

(Continued)

FOREIGN PATENT DOCUMENTS

WO 2021189027 A1 9/2021

OTHER PUBLICATIONS

International Search Report and Written Opinion of the International Searching Authority in corresponding International Application No. PCT/EP2022/061611 mailed Jan. 4, 2023 (13 pages).

*Primary Examiner* — Faris S Almatrahi
*Assistant Examiner* — Dana F Artimez
(74) *Attorney, Agent, or Firm* — Jeffri A. Kaminski; Venable LLP

(57) ABSTRACT

A method for routing an autonomous vehicle from a start location to a target destination location via a set of road segments is provided. The method includes determining at least two candidate routes comprising a respective subset of the set of road segments. Each of the at least two candidate routes indicates how the autonomous vehicle shall travel from the start location, to arrive at the target destination location within a time interval of a target time of arrival. The method determines a flexibility metric for each of the at least two candidate routes indicative of a possible time adjustment when adjusting a speed of the autonomous vehicle. The method selects a route based on the determined flexibility metrics.

14 Claims, 4 Drawing Sheets

(52) U.S. Cl.
CPC ... *B60W 2540/215* (2020.02); *B60W 2552/05* (2020.02); *B60W 2552/20* (2020.02); *B60W 2554/4029* (2020.02); *B60W 2554/406* (2020.02); *B60W 2555/20* (2020.02); *B60W 2556/40* (2020.02)

(58) Field of Classification Search
CPC ..... B60W 2552/20; B60W 2554/4029; B60W 2554/406; B60W 2555/20; B60W 2556/40; G01C 21/3492; G01C 21/3446; G01C 21/3469; G05D 1/0217; G05D 1/0223
See application file for complete search history.

(56) References Cited

U.S. PATENT DOCUMENTS

| | | | | |
|---|---|---|---|---|
| 2019/0051189 | A1* | 2/2019 | De Villele | G01C 21/14 |
| 2019/0293443 | A1* | 9/2019 | Kelly | G01C 21/3415 |
| 2019/0346275 | A1* | 11/2019 | Kelly | G01C 21/3415 |
| 2021/0293573 | A1* | 9/2021 | Sofman | G01C 21/3461 |
| 2022/0136839 | A1* | 5/2022 | Quint | G01C 21/3469<br>701/411 |

* cited by examiner

ROUTING OF AN AUTONOMOUS VEHICLE TO ARRIVE AT A TARGET TIME OF ARRIVAL

CROSS-REFERENCE TO RELATED APPLICATIONS

This application is a U.S. National Stage application of PCT/EP2022/061611, filed Apr. 29, 2022 and published on Nov. 2, 2023, as WO 2023/208384, all of which is hereby incorporated by reference in its entirety.

TECHNICAL FIELD

The invention relates to a method for routing of an autonomous vehicle to arrive at a target time of arrival, or at least within a time interval of the target time of arrival. The invention further relates to a control unit, an autonomous vehicle, a control station, a computer program, and a computer program product.

The invention can be applied in any autonomous vehicles such as cars, heavy-duty vehicles, trucks, buses, marine vessels, and construction equipment. Although the invention will be described with respect to an autonomous vehicle, the invention is also applicable to semi-autonomous vehicles.

BACKGROUND

When planning a route for an autonomous vehicle, an optimization parameter is typically selected such that the route is planned, as well as possible, with respect to the chosen optimization parameter. Typically the route is planned to arrive as quickly as possible, i.e. by finding a shortest path in a graph of road segments.

When planning to arrive as quickly as possible, a problem arises in that an autonomous vehicle may have to wait at their destination as it arrives too early, e.g., before a set time slot for the autonomous vehicle or before an area, e.g. a warehouse, is open for entering. This leads to that the autonomous vehicle remains idle just before a target destination for some time before proceeding. In these situations, the autonomous vehicle is standing still at a known location or an easy to predict location, and therefore will be vulnerable to break-ins, theft, etc. Furthermore, since the autonomous vehicle arrives early, the route is typically not well chosen with regards to other driving parameters, as compared with if a slower route was selected, e.g. resulting in increased fuel and/or energy consumption and/or increased wear of vehicle components such as brake usage and/or clutch wear. When arriving too early to a destination, it may further be the case that the arrival is in the middle of the night, which may demand a user of the autonomous vehicle to wake up and perform tasks related to the autonomous vehicle or the destination during night-time. This is both bad for productivity and health of the user. Furthermore, regulation may restrict duration and which time periods the user is allowed to perform these tasks.

Hence, there is an ongoing strive to improve the efficiency and security of routing autonomous vehicles.

SUMMARY

An object of the invention is to improve the efficiency and security of operating an autonomous vehicle to a destination.

According to a first aspect, the above object is achieved by a method according to claim 1. Hence, there is provided a method for routing an autonomous vehicle from a start location to a target destination location via a set of road segments. The method comprises:

obtaining for each respective road segment in the set of road segments, a travel duration time and a travel deviation time indicating a possible time adjustment in the travel duration when adjusting a speed of the autonomous vehicle in the respective road segment, obtaining a target time of arrival at the target destination location, using the travel duration time, determining at least two candidate routes comprising a respective subset of the set of road segments, wherein each of the at least two candidate routes indicate how the autonomous vehicle shall travel from the start location, via the respective subset of the set of road segments, to arrive at the target destination location within a time interval of the target time of arrival, determining a flexibility metric for each of the at least two candidate routes, the flexibility metric being determined based on the travel deviation time of each of the respective road segments in the respective candidate route, based on the determined flexibility metrics, selecting a route from the at least two candidate routes to be used by the autonomous vehicle to travel to the target destination location.

Since each candidate route is to arrive at the target destination location within the time interval of the target time of arrival, the autonomous vehicle is able to arrive within a time span of a specified time, and thus minimize or completely remove any idle time for when the autonomous vehicle arrives at the target destination. This improves productivity as tasks associated with the target destination may be immediately started at arrival without wait, and since idle time is minimized or reduced, security is improved as the autonomous vehicle is on the move during the whole trip, thus making it harder for thieves to attempt to break into the vehicle. Furthermore, since the at least two candidate routes are determined for the target arrival time and not a strict shortest path, there is an extra degree of freedom in further optimizing paths in the route with respect to other parameters, e.g. improved fuel and/or energy consumption and/or less wear of vehicle components such as brake usage and/or clutch wear.

Furthermore, as the route is selected out of the at least two candidate routes based on the flexibility metrics, it is ensured that the route which is the most flexible route is selected. This means that the selected route is associated with the highest possible travel deviation times of its road segments. In other words, the selected route has the highest possibility for the autonomous vehicle to be able to adjust its speed to meet the target time of arrival. The autonomous vehicle may for example adjust its speed due to unexpected events in road segments causing the autonomous vehicle to be behind or ahead of schedule, e.g. due to accidents, wildlife encounters, unexpected low/high amount of pedestrians to stop for, changed speed limits, etc. The autonomous vehicle may also be free to adjust its speed for optimizing for improved fuel and/or energy consumption and/or less wear of vehicle components such as brake usage and/or clutch wear, and still be able to make the target time of arrival, e.g. as a corresponding speed adjustment may be made up for in other road segments due to the flexibility of the selected route.

Optionally the method further comprises obtaining, for each respective road segment in the set of road segments, at least one road segment characteristics, and wherein obtaining the travel deviation time for each respective road segment in the set of road segments, comprises determining the travel deviation time based on the at least one road segment characteristics.

Each of the at least one road segment characteristics may comprise any one or more out of:

weather conditions for at least one time period in the road segment, distance of the road segment, a driving profile of the road segment, a maximum speed, a minimum speed, a confidence level of travel duration, information of obstacles in the road segment, an amount of traffic and/or traffic variation of the road segment, and a road type of the road segment.

Determining the travel deviation time based on the at least one road segment characteristics improves the accuracy of selecting the most flexible route as determining the flexibility metric, at least partially based on the characteristics of the respective road segments, enables selecting the route out of the at least two candidate routes with respective road segments that have the most flexible characteristics, i.e. are associated with highest travel deviation time(s).

Optionally, determining the travel deviation time based on the at least one road characteristics comprises mapping the at least one road characteristics to a predetermined travel deviation time.

In this way, the determination of the travel deviation time is at least partially performed in advance or known by heuristics, and thus the determination of the travel deviation time is performed in a fast and efficient manner, as it may e.g. involve a simple lookup in a table.

Optionally, determining the flexibility metric comprises estimating a time spent performing one or more traffic actions when travelling each of the respective road segments.

Estimating the time spent performing the one or more traffic actions may comprise estimating any one or more out of:

time spent in traffic jams, time spent in tolls, time spent re-fuelling and/or re-charging the autonomous vehicle, time spent avoiding pedestrians, and time spent avoiding wildlife encounters.

Estimating the time spent performing the one or more traffic actions improves the accuracy of selecting the most flexible route as determining the flexibility metric, at least partially based on the time spent performing the traffic actions, enables selecting the route out of the at least two candidate routes with respective road segments that are the most flexible, i.e. are associated with highest travel deviation time(s) accounted for estimated time spent performing the one or more traffic actions.

Optionally, the method comprises triggering the autonomous vehicle to travel the selected route.

Optionally, the flexibility metric is a total or average of the travel deviation times of the road segments in the respective at least two candidate routes.

Optionally, the time interval is a time interval before or after the target time of arrival.

In other words, the selected route enables the autonomous vehicle to arrive within the time interval before or after the target time of arrival. Thus the target time of arrival may be when the autonomous vehicle should last arrive, and it being acceptable to arrive within the time interval before the target time of arrival. The target time of arrival may also be when that autonomous vehicle should earliest arrive, and it being acceptable to arrive within the time interval after the target time of arrival.

Optionally, the target time of arrival is determined based on one or more predefined time slots and/or opening hours associated with the target destination location.

Thereby the selected route ensures that the autonomous vehicle arrives at one of the one or more predefined time slots and/or within opening hours of the target destination location.

Optionally the target time of arrival is selected by a user.

In this way the user may select a target time of arrival best suitable to the productivity of the user and/or the autonomous vehicle. For example, the user may select a target time of arrival which align well in time for the user to work with tasks associated with the autonomous vehicle or the target destination position at the target time of arrival. This allows for the user to plan for resting while the autonomous vehicle is driving to the target destination location and select a target time of arrival when it is suitable for the user to wake up.

Optionally, determining at least two candidate routes comprises selecting road segments to be part of the respective candidate route by performing a route search from the start location to the target destination.

According to a second aspect, there is provided a control unit to perform the method according to the first aspect. The control unit may be an electronic control unit. Advantages and effects of the control unit are largely analogous to the advantages and effects of the method. Further, all embodiments of the control unit are applicable to and combinable with all embodiments of the method, and vice versa.

According to a third aspect, there is provided an autonomous vehicle comprising the control unit according to the second aspect. The autonomous vehicle is configured to travel from a start location via a set of road segments, and to arrive at a target destination location within a time interval of a target time of arrival. Advantages and effects of the autonomous vehicle are largely analogous to the advantages and effects of the method and/or the control unit. Further, all embodiments of the vehicle are applicable to and combinable with all embodiments of the method, and vice versa.

According to a fourth aspect, there is provided a control station comprising the control unit according to the second aspect. The control station is communicatively coupled with an autonomous vehicle. The control station is configured to route the autonomous vehicle from a start location to a target destination location via a set of road segments, and to arrive at the target destination location within a time interval of a target time of arrival. Advantages and effects of the control station are largely analogous to the advantages and effects of the method and/or the control unit. Further, all embodiments of the vehicle are applicable to and combinable with all embodiments of the method, and vice versa.

According to a fifth aspect, there is provided a computer program comprising program code means for performing the method according to the first aspect, when said program is run on a computer. Advantages and effects of the computer program are largely analogous to the advantages and effects of the method. Further, all embodiments of the computer program are applicable to and combinable with all embodiments of the method, and vice versa.

According to a sixth aspect, there is provided a computer program medium carrying a computer program comprising program code means for performing the method according to the first aspect, when said program is run on a computer. Advantages and effects of the computer program medium are largely analogous to the advantages and effects of the method. Further, all embodiments of the computer program medium are applicable to and combinable with all embodiments of the method, and vice versa.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
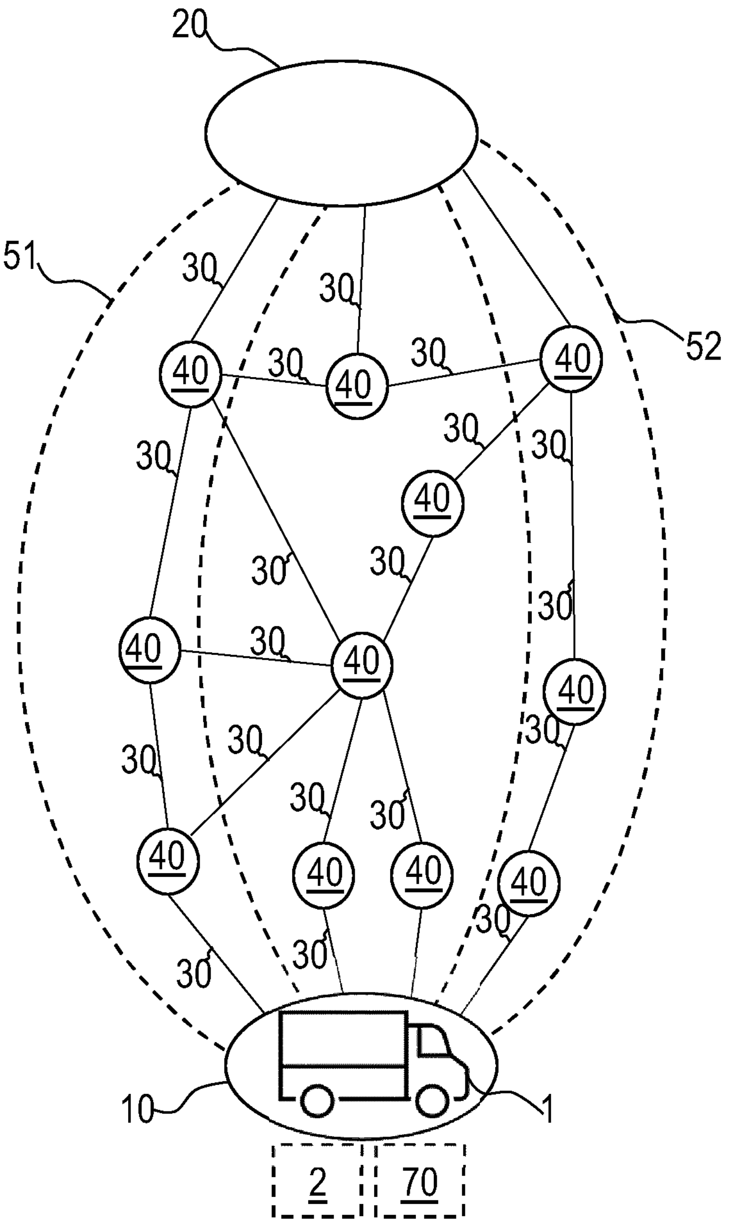
FIG. 1 is a schematic overview of an autonomous vehicle, road segments and at least two candidate routes.

FIG. 1 illustrates a schematic overview of an autonomous vehicle 1. The term autonomous used in conjunction with the autonomous vehicle 1 herein means that the autonomous vehicle 1 is at least partly autonomous, i.e. there is at least some automated control of the operations of the autonomous vehicle 1, e.g. the autonomous vehicle 1 may drive without aid of a user. The autonomous vehicle 1 may be any type of vehicle, e.g. car, truck, bus, heavy-duty vehicle, or wheel loader, marine vessel etc. In some embodiments the autonomous vehicle 1 is synchronized to a platoon of vehicles which follows the autonomous vehicle 1.

The autonomous vehicle 1 is located at a start location 10 and is arranged to travel to a target destination location 20. Between the start location 10 and the target destination location 20 is a set of road segments 30, which connects the start location 10 and the target destination 20 and multiple intermediate locations 40. In other words, to travel from the start location 10 to the target destination 20, the autonomous vehicle 1 needs to traverse a path of road segments in the set of road segments 30 and on the way, pass one or more of the locations in the multiple intermediate locations 40.

A collection of road segments out of the set of road segment 30, which the autonomous vehicle 1 may use to travel on from the start location 10 to the target destination location 20 is referred to as a route. The route may have a list of which order to traverse which road segment. When the number of road segments in the set of segments 30 grow large, determining such a route grows exponentially complex as the number of combinations of road segments that may be used quickly becomes very high. It follows that finding such routes are computationally intensive.

Hence, to determine a route, route searching algorithms may be used which comprises determining which road segments should be part of the route. This procedure may be referred to as routing the autonomous vehicle 1. When considering merely reaching the target destination location 20 from the start location 10, many routes are possible. However, route searching algorithms typically select certain routes based on some optimization parameters such as finding a shortest path to the target destination location 20. This however risks making the autonomous vehicle 1 arrive early, e.g. before opening hours, or in the middle of the night forcing users to wake up in the middle of the night. Using a shortest path may also cause security problems. This is since the autonomous vehicle 1 may easily be predicted to be standing idle before the target destination location 20 waiting for before opening hours and thereby become a target for thieves. Furthermore, when using a shortest path for a route, other driving parameters are neglected leading to unnecessary high fuel and/or energy consumption and/or high wear of vehicle components such as brake usage and/or clutch wear.

Thus, embodiments herein relate to determining at least two candidate routes 51, 52 which routes, if used by the autonomous vehicle 1, allow the autonomous vehicle 1 to arrive at the target destination location 20 within a time interval of a target time of arrival.

Determining the at least two candidate routes 51, 52 to arrive within the time interval of the target time of arrival is an option with higher degree of freedom than selecting a shortest path, which thus allows the route searching algorithm to find routes that arrive within the time interval of the target time of arrival and which could also be optimized for the above-mentioned other driving parameters. This is since there may be longer paths that you may consider which have better road conditions, less curves, better speed limits for driving eco-friendly, e.g. fuel efficient, etc.

Determining a route based on the target time of arrival allows a user of the autonomous vehicle 1 to plan his or her journey and/or a fleets journey accurately, and use the time travelling for other productive tasks and/or for resting and knowing that the autonomous vehicle 1 will not arrive in the middle of the night demanding that the user wakes up to perform tasks related to the autonomous vehicle 1 and/or the target destination 10. Routing based on the target time of arrival also ensures that the autonomous vehicle 1 will minimise or eliminated time the autonomous vehicle 1 is idle, thus reducing risks of break-ins.

Unexpected events may occur when the autonomous vehicle 1 is driving on any one of the at least two candidate routes 51, 52, and therefore, embodiments herein relates to selecting the route out of the at least two candidate route 51, 51 for the autonomous vehicle 1 to use, by first determining which of the routes are the most flexible, i.e. which of the at least two candidate routes 51, 52 allow for a highest possible time adjustment when adjusting the speed of the autonomous vehicle 1. In this way, the autonomous vehicle 1 may adjust its speed to meet the target time of arrival. This also enables the autonomous vehicle 1 to, independently, at any time driving in the route, determine to adjust its speed for some road segments, e.g. to improve fuel/energy consumption and/or to reduce wear of the autonomous vehicle 1. This is possible since the autonomous vehicle 1 will still be able to arrive at the target time of arrival as there is room for flexibility to drive faster or slower at different road segments of the route.

Further advantages of arrival time further away in time than using a shortest path or other quicker routes may lead to any one or more out of the following advantages:

- decrease in fuel consumption, e.g. due to the autonomous vehicle 1 performing any one or more out of: speed reductions, torque reduction, long and smooth accelerations, long and smooth deceleration, avoid curvy roads or hilly roads,
- mechanical parts care, e.g. due to smoother driving
- mechanical parts wear, e.g. due to less clutch friction, less usage of brakes pads, tires, and suspension,
- avoiding too early arrivals before a loading area in the target destination location 20 is open, avoiding bad timing arrivals, e.g. and not knowing where to park and/or wait, and increasing safety by slowing down and/or adjusting operations of the autonomous vehicle 1 for certain weather conditions, traffic situations, and/or dangerous areas occurring during the route.

A control station 2 may be communicatively coupled with the autonomous vehicle 1. The control station 2 may be configured to route the autonomous vehicle 1 from the start location 10 to the target destination location 20 via the set of road segments 30, and to arrive at the target destination location 20 within the time interval of the target time of arrival. As used herein, for the control station 2 to route the autonomous vehicle 1, means determining the at least two candidate routes 51, 52 and selecting which route for the autonomous vehicle 1 to use. The control station 2 may also be configured to indicate the selected route to the autonomous vehicle 1.

Embodiments herein may be performed by a control unit 70. The control unit 70 may be comprised in the autonomous vehicle 1 but may also be comprised in any other suitable location communicatively connected with the autonomous vehicle 1, such as in the control station 2, or e.g., in a remote cloud environment. The control unit 70 may be a distributed unit, e.g. with several different parts comprised at different respective locations, e.g. a first part in the autonomous vehicle 1 and a second part in the control station 2. The control unit 70 may further comprise and/or be communicatively connected with the autonomous vehicle 1 and/or the control station 2.

Figure 2:
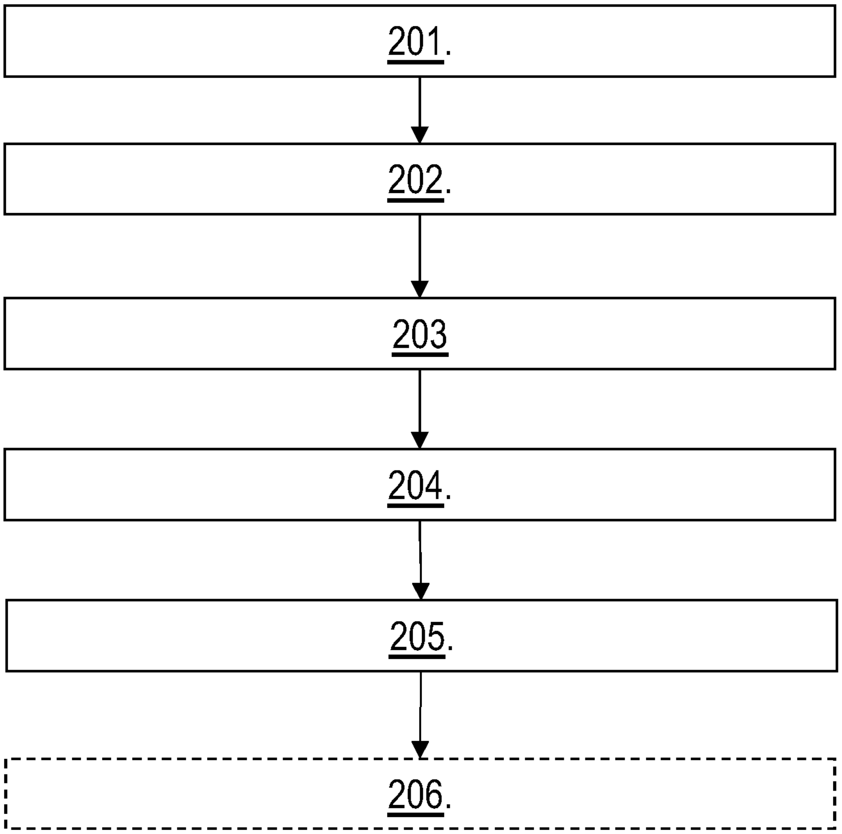
FIG. 2 is a flowchart illustrating a method.

FIG. 2 illustrates a method performed by the control unit 70 for routing the autonomous vehicle 1 from the start location 10 to the target destination location 20 via the set of road segments 30. Routing the autonomous vehicle 1, means to determine and select a route the autonomous vehicle 1 shall use for travelling from the start location 10 via the set of road segments 30, to the target destination location 20. The method comprises the following actions described below, which actions may be taken in any suitable order. Optional actions are indicated by dashed boxes in FIG. 2.

Action 201

The method comprises obtaining a travel duration time and a travel deviation time for each respective road segment in the set of road segments 30. The travel duration time may be a time indicating how long it takes to travel through the road segment. For example, the travel duration time may be an average time it takes to travel through the respective road segment. The travel duration time may have been estimated based on a known average speed of the autonomous vehicle 1 and the distance of the respective road segment, and/or may have been estimated using any other suitable method.

The travel deviation time indicates a possible time adjustment in the travel duration, when adjusting a speed of the autonomous vehicle 1 in the respective road segment. The travel deviation time may for example relate to a time difference in adjusting the autonomous vehicle's 1 speed to a maximum or minimum speed associated for when driving in the respective road segment. While a maximum speed may be a regulatory limit, the minimum speed may be a speed which differs from different types of roads and may be dependent on safety parameters of the autonomous vehicle 1. For example, some road segments may have a regulatory maximum speed of 90 kilometres per hour (kph), but it may be acceptable for the autonomous vehicle 1 to drive as slow as 70 kph. The travel duration time for these road segments may relate to an average of 95 kph, and thus, increasing the speed to the maximum of 100 kph allows for devoting less time in the road segment, and decreasing the speed to 70 kph allows for the autonomous vehicle 1 to delay in the road segment for some time longer without breaking any regulations or endangering surrounding traffic.

In some embodiments, the method comprises, obtaining, for each respective road segment in the set of road segments 30, at least one road segment characteristics. In these embodiments obtaining the travel deviation time for each respective road segment in the set of road segments 30, comprises determining the travel deviation time based on the at least one road segment characteristics. In other words, the travel deviation time may be determined dynamically based on the at least one road segment characteristics.

Each of the at least one road segment characteristics may comprise any one or more out of:

weather conditions for at least one time period in the road segment, distance of the road segment, a driving profile of the road segment, a maximum speed, a minimum speed, a confidence level of travel duration time, information of obstacles in the road segment, an amount of traffic and/or traffic variation of the road segment, and a road type of the road segment.

For different weather conditions, maximum and minimum speeds that the autonomous vehicle 1 is capable of safely operate may be affected. The weather conditions may be indicated for multiple times of days as weather may change rapidly and different weather conditions may require for safety for different speeds and the autonomous vehicle 1 may in different routes use the road segment during different times.

The distance of the road segment may indicate a magnitude of an impact the road segment makes when adjusting the speed of the autonomous vehicle 1 for driving in the respective road segment.

The confidence level of the travel duration may indicate how likely it is that the autonomous vehicle 1 will travel in the respective road segment within a time interval of the travel duration time. If the confidence level is low, the autonomous vehicle 1 is likely not to meet the indicated travel duration time, and thereby the time for driving in the road segment may vary significantly.

The road type of the road segment may indicate that the road segment is a high-way or a countryside road. The road type may further indicate the topography of the road segment, e.g. number of curves, hills, if it is in proximity of certain areas, schools, cities, wildlife in the area, etc. The topography of the road segment may e.g. indicate how likely it is that the autonomous vehicle 1 needs to make unexpected stops e.g. related to a pedestrian crossing probability, slow persons crossing such as elderly people, young kids, person with limited mobility, wild animals crossing probabilities, and/or domestic animals crossing in cities.

The driving profile of the road segment may comprise statistics of how driving is generally performed, e.g. with respect to type of road, in the road segment. For example driving profiles of countryside or city roads. The driving profile may indicate quality of a shape of a road in the road segment, whether the road segment is a narrow road, visibility, and/or whether or not the roads are paved.

The information of obstacles in the road segment may comprise one or more positions of obstacles and/or frequency of obstacles in the road segments. The information of obstacles may also relate to a frequency of pedestrians in the road segment. Considering the information of obstacles in the road segments, it is possible to deduce how the obstacles affect a potential maximum and/or minimum speed in the respective road segment.

The amount of traffic and/or traffic variation of the road segment may relate to an amplitude in traffic variation, e.g. a worst case scenario of how much traffic it may be in the road segment. The traffic and/or traffic variation which in turns affect maximum and minimum speeds in the respective road segment.

Determining the travel deviation time based on the at least one road characteristics may comprise mapping the at least one road characteristics to a predetermined travel deviation time. For example, the at least one road characteristics may be mapped to a travel deviation time, at least partly using a table lookup.

Action 202

The method comprises obtaining a target time of arrival at the target destination location 20. The target time of arrival may for example be used to schedule the autonomous vehicle 1 to arrive after opening, or before, closing of door, fence, warehouse, etc. In some embodiments, the target time of arrival is determined based on one or more predefined time slots and/or opening hours associated with the target destination location. In other words, there may be a time slot for the autonomous vehicle 1 to meet at the target destination location 20, or the target destination location 20 is only open for the autonomous vehicle 1 at certain times, e.g. during business hours.

The target time of arrival may be selected by a user. The user may be a passenger of the autonomous vehicle 1 which needs to assist the autonomous vehicle 1 e.g., at the target destination location 20 and/or may have other tasks at the target destination location 20.

Action 203

The method comprises, using the travel duration time, determining at least two candidate routes 51, 52 comprising a respective subset of the set of road segments 30. While two candidate routes are sufficient, many more candidate routes may be determined. Each of the at least two candidate routes 51, 52 indicates how the autonomous vehicle 1 shall travel from the start location 10, via the respective subset of the set of road segments 30, and to arrive at the target destination location 20 within a time interval of the target time of arrival. The candidate routes 51, 52 differ at least partially on which of road segments are used in the respective routes. For some of the candidate routes 51, 52, e.g. to delay a trip to meet the target time of arrival, cycles may appear, i.e. some road segments in a candidate route may be indicated to be travelled more than once.

The time interval may be used as a margin of error for being able to find several candidate routes 51, 52 for the autonomous vehicle 1. The time interval may e.g. be a time interval before or after the target time of arrival.

Determining the at least two candidate routes 51, 52 may comprise selecting road segments to be part of the respective candidate route by initiating a route search from the start location 10 to the target destination 20. The route search may use any suitable route search algorithm for finding routes in a graph using the travel duration time of the road segments and optimizing for the target time of arrival. The algorithm used for route searching may e.g. be D* or any other suitable route searching algorithm.

Determining the at least two candidate routes 51, 52 may further comprise in a route search starting from the target destination 20, searching for routes towards the start location 10 by calculating a best combination of road segment usage to meet the target time of arrival e.g., and potentially other additional criteria. Several road segment combinations usage may evaluated as a sub-route, i.e. comprising determining how they, in aggregate, will affect the target time of arrival e.g., and potentially other additional criteria.

Action 204

The method comprises determining a flexibility metric for each of the at least two candidate routes 51, 52. The flexibility metric is determined based on the travel deviation time of each of the respective road segments 30 in the respective candidate route. In other words, the flexibility metric indicates a total flexibility of the at least two candidate routes 51, 52, in how much the autonomous vehicle 1 may adjust its travel duration time by adapting its speed when travelling in the road segments of the respective candidate route.

The flexibility metric may for example be a total or average of the travel deviation times of the road segments in the respective route of the at least two candidate routes 51, 52.

In this way, it is possible to select the most flexible routes of the at least two candidate routes 51, 52. The more flexible the route, the more opportunity the autonomous vehicle 1 has to adapt its speed in road segments to meet the target time of arrival within the time interval, in a secure manner without breaking any traffic rules or needing to re-route the autonomous vehicle 1.

Determining the flexibility metric may comprise estimating a time spent performing one or more traffic actions when travelling each of the respective road segments 30. This may additionally or alternatively also be performed as part of determining the travel deviation time in action 201.

Estimating the time spent performing the one or more traffic actions may comprise estimating any one or more out of:

- time spent in traffic jams,
- time spent in tolls,
- time spent re-fuelling and/or re-charging the autonomous vehicle 1,
- time spent avoiding pedestrians, and
- time spent avoiding wildlife encounters.

When the autonomous vehicle 1 performs a significant time performing a traffic action e.g., waiting in traffic jams, the flexibility metric may be affected significantly in a negative manner. In some embodiments, the flexibility metric may be weighted with different weights corresponding to the different types of one or more traffic actions. The weights may respectively be multiplied with the autonomous vehicle's 1 estimated time spent performing the one or more traffic actions.

The estimated time spent performing the one or more traffic actions may be dependent on time, the road segment characteristics and/or geographic location. For example, daytime in a city relates to a high chance of pedestrian encounters and relates to a low chance of wildlife encounters. Driving in some geographic regions may indicate a high chance of devoting times in tolls. Driving in some other geographic regions may indicate zero chance of devoting times in tolls. Other examples may comprise road work areas, school areas depending on local school time, buses stops and bus stations, delivery locations, entertainments events such as football matches or concerts around stadium.

Action 205

The method further comprises selecting, based on the determined flexibility metrics, a route from the at least two candidate routes 51, 52 to be used by the autonomous vehicle 1 to travel to the target destination location.

As the flexibility metrics indicate which route of the at least two candidate routes 51, 52 is the most flexible, it is ensured that when the autonomous vehicle 1 travels the selected route, the selected route has the most opportunities for the autonomous vehicle 1 to adjust its speed, and thereby has the best chances to arrive at the target destination location 20 within the time interval of the target time of arrival even when one or more unexpected events occur during the route.

Action 206

The method may further comprise triggering the autonomous vehicle 1 to travel the selected route. For example, triggering the autonomous vehicle 1 to travel the selected route may comprise the autonomous vehicle 1 starting the route independently and/or the control station 2 sending instructions to the autonomous vehicle 1 to indicate to the autonomous vehicle 1 to start the selected route.

Example Scenario

Figure 3:
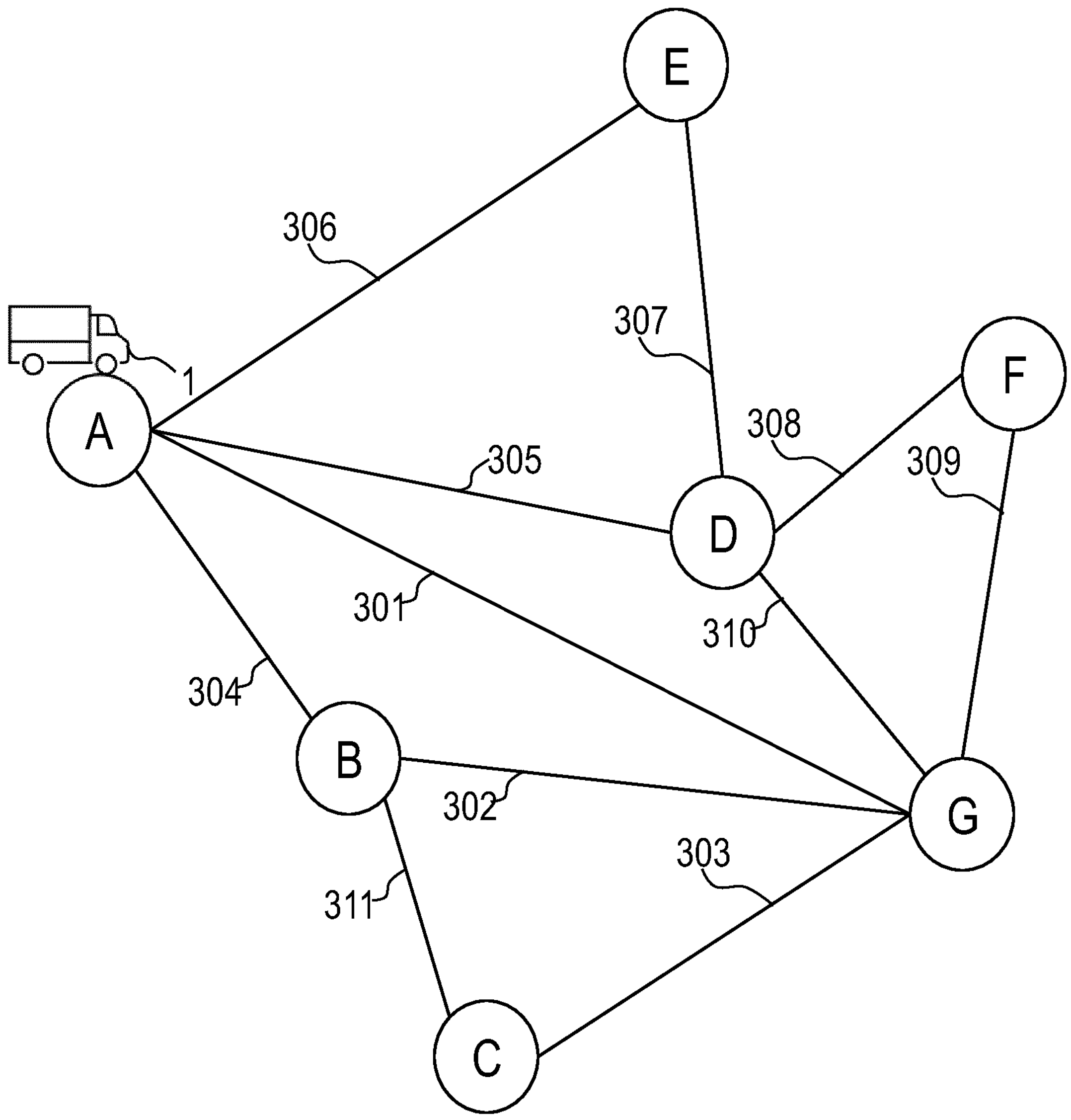
FIG. 3 is an illustrations of example scenario of selecting a route.

FIG. 3 illustrates an example scenario according to embodiments herein. In FIG. 3, an example scenario of road segments 301, 302, 303, 304, 305, 306, 307, 308, 309, 310, 311, e.g. part of the set of road segments 30, between locations A, B, C, D, E, F, e.g. part of the multiple intermediate locations 40, is illustrated. In the example scenario, the autonomous vehicle 1 is located at location A which may be the start location 10. The autonomous vehicle 1 is arranged to drive to the location G which may be the target destination location 20.

Each road segment of the road segments 301-311 may be characterized with the following road segment characteristics, e.g. as obtained in action 201. The road segment characteristics may comprise any one or more out of:

- road types,
- route topography,
- information of curves in the road segment,
- information of hills in the road segment,
- traffic estimation,
- amplitude of traffic variation, e.g. a worst case scenario of traffic,
- information of obstacles in the road segment,
- information of traffic lights in the road segment,
- information of crossroads in the road segment,
- information of speed bumps in the road segment,
- estimated time spent fuelling and/or in tolls,
- weather conditions, and
- distance.

Using the combined road segment characteristics, the following may be determined for each road segment 301-311:

- a minimum safe and legal speed possible,
- a maximum safe and legal speed allowed,
- an optimal time of day to go through the respective road segment,
- a profile of driving dynamic, e.g. comprising any one or more out of acceleration, deceleration, and/or braking, and
- a confidence level of a travel duration time.

Candidate routes 1-3 from A to G which arrive within the time interval of the target time of arrival may be determined, e.g. as in action 203 and may be the following routes:

- Candidate Route 1: 301, e.g. directly from A to G,
- Candidate Route 2: 304-311-303, e.g. from A to B, to C, to G, and
- Candidate Route 3: 305-308-309, e.g. from A to D to F to G.

The above candidate routes 1-3 are compared based on the flexibility for time adjustment, e.g. allowed speed variation for the autonomous vehicle 1, e.g. as described with the above mentioned actions 201-206. The above candidate routes 1-3 may correspond to the at least two candidate routes 51, 52 e.g. described in actions 201-206.

Additionally, e.g. when the flexibility metrics of the candidate routes are the same or very similar, e.g. within a threshold, the candidate routes 1-3 may be further evaluated and/or selected based on any one or more out of:

- travel duration, e.g. calculated with a speed gap compliant with speed regulations and a safety level required for autonomous vehicles, e.g. the shortest travel duration,
- cost, e.g. most fuel efficient, and
- impact on vehicle aging, e.g. the candidate route with acceleration/deceleration patterns and/or braking needs which involves the least amount of wear on components of the autonomous vehicle 1.

As an example of evaluating above-mentioned candidate routes 1-3:

- Going through candidate route 1, e.g. a highway, may be an acceptable option but may risk that the autonomous vehicle 1 arrives too early, then causing the autonomous vehicle 1 to have to wait for at least a short duration.
- Going through candidate route 2 may be better than candidate route 1 as the time of arrival is met without difficulty. However there may be a big variation of traffic on road segment 311 which makes it difficult to determine a travel duration time with high precision. However, the following road segment 303 of candidate route 2 is a slow-paced city road which much flexibility to compensate in case there is a lot of difference in travel duration after going through road segment 311.
- Going through candidate route 3 may be the best. This is since the time of arrival is reached with high flexibility. There is likely low traffic variation as all of the road segments are low traffic countryside roads, which countryside roads has high flexibility in maximum and minimum speed.

To perform the method actions described herein, the control unit 70 may be configured to perform any one or more of the above actions 201-206 or any of the other examples or embodiments herein. As previously mentioned, the control unit 70 may be comprised in any suitable location such as e.g. the control station 2 and/or the autonomous vehicle 1.

The control unit 70 may be communicatively coupled with the control station 2 and/or the autonomous vehicle 1. The control unit 70 may for example comprise an arrangement depicted in FIGS. 4*a* and 4*b*.

The control unit 70 may comprise an input and output interface 400 configured to communicate with any necessary components and/or entities of embodiments herein. The input and output interface 400 may comprise a wireless and/or wired receiver (not shown) and a wireless and/or wired transmitter (not shown). The control unit 70 may be arranged in any suitable location of the vehicle 1. The control unit 70 may use the input and output interface 400 to control and communicate with sensors, actuators, subsystems, and interfaces in the vehicle 1 by using e.g., any one or more out of: Controller Area Network (CAN), ethernet cables, Wi-Fi, Bluetooth, and/or other sutiable interfaces.

The control unit 70 may be configured to, e.g. by means of an obtaining unit 401 in the control unit 70, obtain, for each respective road segment in the set of road segments 30, a travel duration time and a travel deviation time indicating a possible time adjustment in the travel duration, when adjusting a speed of the autonomous vehicle 1 in the respective road segment.

The control unit 70 may be configured to, e.g. by means of the obtaining unit 401 in the control unit 70, obtain, a target time of arrival at the target destination location 20.

The control unit 70 may be configured to, e.g. by means of a determining unit 402 in the control unit 70, determine at least two candidate routes 51, 52 comprising a respective subset of the set of road segments 30, wherein each of the at least two candidate routes 51, 52 indicates how the autonomous vehicle 1 shall travel from the start location 10, via the respective subset of the set of road segments 30, to arrive at the target destination location 20 within a time interval of the target time of arrival.

The control unit 70 may be configured to, e.g. by means of the determining unit 402 in the control unit 70, determine a flexibility metric for each of the at least two candidate routes 51, 52, the flexibility metric being determined based on the travel deviation time of each of the respective road segments 30 in the respective candidate route, The control unit 70 may be configured to, e.g. by means of a selecting unit 403 in the control unit 70, based on the determined flexibility metrics, select a route from the at least two candidate routes 51, 52 to be used by the autonomous vehicle 1 to travel to the target destination location.

The control unit 70 may be configured to, e.g. by means of a triggering unit 404 in the control unit 70, trigger the autonomous vehicle 1 to travel the selected route.

Figure 4A:
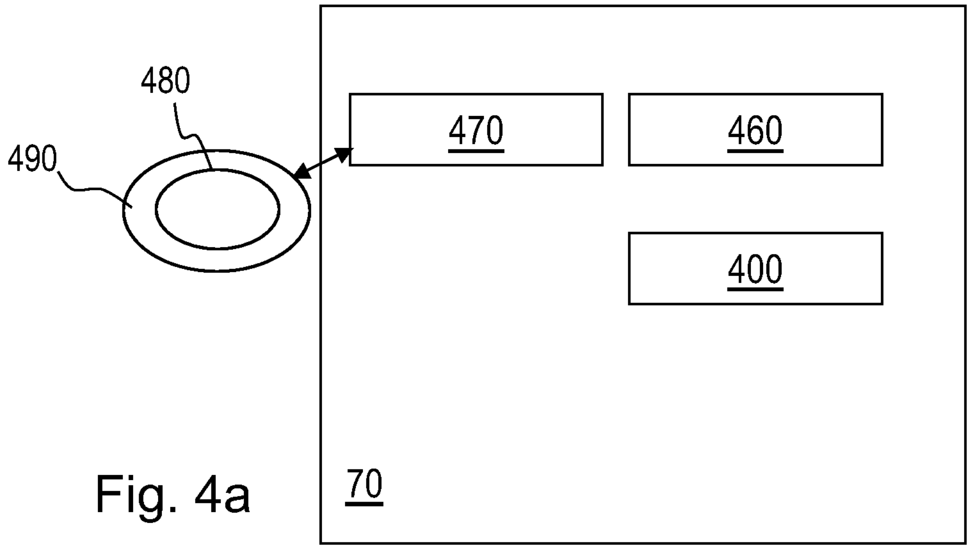
FIGS. 4*a*-4*b* are schematic block diagrams illustrating a control unit according to embodiments herein.
Figure 4B:
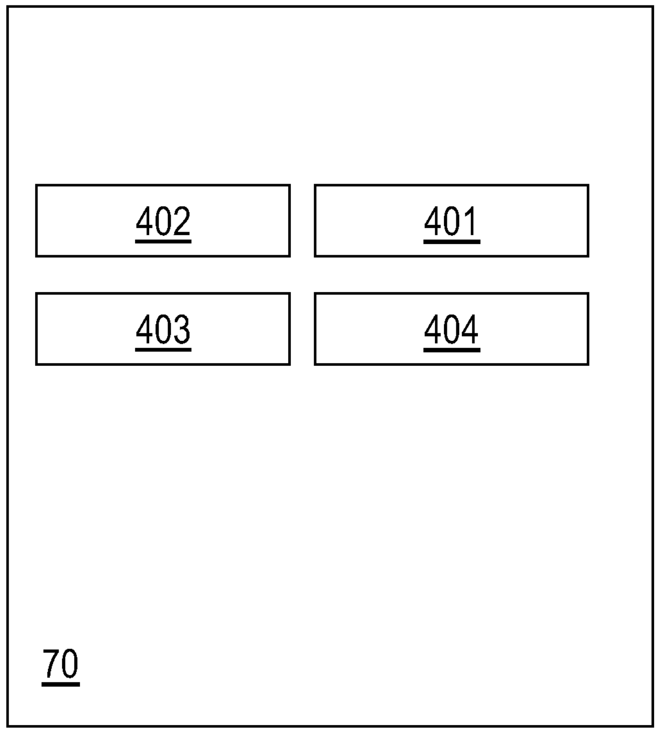

The embodiments herein may be implemented through a processor or one or more processors, such as the processor 460 of a processing circuitry in the control unit 70 depicted in FIG. 4*a*, together with computer program code for performing the functions and actions of the embodiments herein. The program code mentioned above may also be provided as a computer program medium, for instance in the form of a data computer readable medium carrying computer program code for performing the embodiments herein when being loaded into the control unit 70. One such computer readable medium may be in the form of a memory stick. The computer program code may furthermore be provided as pure program code on a server and downloaded to the control unit 70.

The control unit 70 may further comprise a memory 470 comprising one or more memory units. The memory 470 comprises instructions executable by the processor in control unit 70. The memory 470 is arranged to be used to store e.g. information, indications, data, configurations, sensor data, positioning information, scanned surroundings of the vehicle 1, and applications to perform the methods herein when being executed in the control unit 70.

In some embodiments, a computer program 480 comprises instructions, which when executed by a computer, e.g. the at least one processor 460, cause the at least one processor of the control unit 70 to perform the actions 201-206 above.

In some embodiments, a computer-readable storage medium 490 comprises the respective computer program 480. The computer-readable storage medium 490 may comprise program code for performing the steps of any one or more out of actions 201-206 above when said program product is run on a computer, e.g. the at least one processor 460.

Those skilled in the art will appreciate that the units in the control unit 70 described above may refer to a combination of analogue and digital circuits, and/or one or more processors configured with software and/or firmware, e.g. stored in the control unit 70, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

It is to be understood that the present invention is not limited to the embodiments described above and illustrated in the drawings; rather, the skilled person will recognize that many changes and modifications may be made within the scope of the appended claims.

The invention claimed is:

1. A method for routing an autonomous vehicle from a start location to a target destination location via a set of road segments, the method comprising:

obtaining for each respective road segment in the set of road segments, a travel duration time and a travel deviation time indicating a possible time adjustment in the travel duration, when adjusting a speed of the autonomous vehicle in the respective road segment, wherein the travel deviation time relates to a time difference associated with adjusting the speed of the autonomous vehicle to a maximum speed or a minimum speed for the respective road segment, obtaining a target time of arrival at the target destination location, and using the travel duration time, determining at least two candidate routes comprising a respective subset of the set of road segments, wherein each of the at least two candidate routes indicates how the autonomous vehicle shall travel from the start location, via the respective subset of the set of road segments, to arrive at the target destination location within a time interval of the target time of arrival, determining a flexibility metric for each of the at least two candidate routes, the flexibility metric being determined based on the travel deviation time of each of the respective road segments in the respective candidate route, wherein the flexibility metric is a total or average of the travel deviation times of the road segments in the respective at least two candidate routes, based on the determined flexibility metrics, selecting a route from the at least two candidate routes to be used by the autonomous vehicle to travel to the target destination location, wherein selecting comprises selecting, from the at least two candidate routes, the route which has the highest possible travel deviation times of its road segments as indicated by the flexibility metrics, and controlling the autonomous vehicle to travel the selected route.

2. The method according to claim 1, further comprising obtaining, for each respective road segment in the set of road segments, at least one road segment characteristics, and wherein obtaining the travel deviation time for each respective road segment in the set of road segments, comprises determining the travel deviation time based on the at least one road segment characteristics.

3. The method according to claim 2, wherein each of the at least one road segment characteristics comprises any one or more out of:

weather conditions for at least one time period in the road segment, distance of the road segment, a driving profile of the road segment, a maximum speed, a minimum speed, a confidence level of travel duration, information of obstacles in the road segment, an amount of traffic and/or traffic variation of the road segment, and a road type of the road segment.

4. The method according to claim 2, wherein determining the travel deviation time based on the at least one road characteristics comprises mapping the at least one road characteristics to a predetermined travel deviation time.

5. The method according to claim 1, wherein determining the flexibility metric comprises estimating a time spent performing one or more traffic actions when travelling each of the respective road segments.

6. The method according to claim 5, wherein estimating the time spent performing the one or more traffic actions comprises estimating any one or more out of:

time spent in traffic jams, time spent in tolls, time spent re-fuelling and/or re-charging the autonomous vehicle, time spent avoiding pedestrians, and time spent avoiding wildlife encounters.

7. The method according to claim 1 wherein the time interval is a time interval before or after the target time of arrival.

8. The method according to claim 1 wherein the target time of arrival is determined based on one or more pre-defined time slots and/or opening hours associated with the target destination location.

9. The method according to claim 1 wherein the target time of arrival is selected by a user.

10. The method according to claim 1, wherein determining the at least two candidate routes comprises selecting road segments to be part of the respective candidate route by initiating a route search from the start location to the target destination.

11. A control unit configured to perform the method according to claim 1.

12. An autonomous vehicle configured to travel from a start location via a set of road segments, to arrive at a target destination location within a time interval of a target time of arrival, and wherein the autonomous vehicle comprises the control unit according to claim 11.

13. A control station configured to route the autonomous vehicle from a start location to a target destination location via a set of road segments, to arrive at the target destination location within a time interval of a target time of arrival, wherein the control station comprises the control unit according to claim 11, and wherein the control station is communicatively coupled with an autonomous vehicle.

14. A non-transitory computer program medium carrying a computer program comprising program code for performing the steps of claim 1 when said program code is run on a computer.

* * * * *